US 6,674,055 B2

(12) United States Patent
Zhang et al.

(10) Patent No.: US 6,674,055 B2
(45) Date of Patent: Jan. 6, 2004

(54) ELECTROMAGNETIC WATER HEATER

(76) Inventors: Shou Jun Zhang, Industrial Road 2, Nan Sha Economic & Technical Development Zone, Na Sha Pan Yu, Guang Dong Province (CN); Zheng Qing Yang, Industrial Road 2, Nan Sha Economic & Technical Development Zone, Na Sha Pan Yu, Guang Dong Province (CN); Qiang Hua Zhao, Industrial Road 2, Nan Sha Economic & Technical Development Zone, Na Sha Pan Yu, Guang Dong Province (CN)

(*) Notice: Subject to any disclaimer, the term of this patent is extended or adjusted under 35 U.S.C. 154(b) by 0 days.

(21) Appl. No.: 10/001,284

(22) Filed: Oct. 31, 2001

(65) Prior Publication Data
US 2003/0080115 A1 May 1, 2003

(30) Foreign Application Priority Data
Nov. 1, 2000 (CN) .................. 00240132 U

(51) Int. Cl.⁷ ............................ H05B 6/10
(52) U.S. Cl. ............. 219/629; 219/630; 219/672
(58) Field of Search ............. 219/628, 629, 219/630, 670, 672, 674, 667, 668

(56) References Cited

U.S. PATENT DOCUMENTS

| 3,777,117 A | * | 12/1973 | Othmer | 219/630 |
| 3,936,625 A | * | 2/1976 | Burnett | 219/628 |
| 4,341,936 A | * | 7/1982 | Virgin | 219/630 |
| 4,480,172 A | * | 10/1984 | Ciciliot | 219/305 |
| 4,560,849 A | * | 12/1985 | Migliori et al. | 219/628 |
| 4,814,567 A | * | 3/1989 | De Angelis et al. | 219/628 |
| 5,178,523 A | * | 1/1993 | Cheng-Chung | 417/366 |
| 5,239,916 A | * | 8/1993 | Hu | 99/422 |
| 5,523,550 A | * | 6/1996 | Kimura | 219/628 |
| 6,046,442 A | * | 4/2000 | Kawamura et al. | 219/630 |
| 6,118,111 A | * | 9/2000 | Price et al. | 219/629 |

FOREIGN PATENT DOCUMENTS

| JP | 2-225951 | * | 9/1990 | 219/628 |

OTHER PUBLICATIONS

Derwent Abstract ACC–NO: 1999–459315; Cheng, CN 1217457 (May 26, 1999).*

* cited by examiner

Primary Examiner—Philip H. Leung
(74) Attorney, Agent, or Firm—Jackson Walker L.L.P.

(57) ABSTRACT

A method of heating water comprises providing a helical passageway in juxtaposition a metal core rod and a coil through which an alternating current is passed. The alternating current generates an alternating longitudinal magnetic field that passes through the metal core rod and gives rise to eddy currents that generate heat. Water flowing along a helical passageway is heated and at the same time the water is magnetized as it cuts across lines of magnetic force of the alternating longitudinal magnetic field. A magnetized water generator for uses with the method comprises two bulkheads, a coil, a metal core rod and an outer tube. The core rod is disposed within the outer tube to create a helical passageway. The outer tube and core rod are disposed within the coil. A bulkhead is disposed on each end of the outer tube. Water enters the helical passageway through the water inlet in one end bulkhead and out of the helical passageway via a water outlet on the other end bulkhead.

6 Claims, 3 Drawing Sheets

A-A

ELECTROMAGNETIC WATER HEATER

FIELD OF THE INVENTION

The invention relates to electric heating of fluids, and in particular to an electromagnetic water heater.

BACKGROUND TO THE INVENTION

Known electric water heaters use resistance heating wires or heating tubes that have low heating efficiency and which can be a potential safety hazard.

SUMMARY OF THE INVENTION

It is an object of the present invention to provide an electromagnetic water heater with high thermal efficiency and to provide magnetization of water during heating.

According to a first aspect of the invention there is a method of heating water comprising providing a helical passageway in juxtaposition a metal core rod and a coil through which an alternating current is passed, the alternating current generating an alternating longitudinal magnetic field which passes through the metal core rod and gives rise to eddy currents that generate heat which is absorbed by water flowing along the helical passageway, and wherein at the same time the water is magnetized as it cuts across lines of magnetic force of the alternating longitudinal magnetic field.

According to a second aspect of the invention there is a magnetized water generator comprising two bulkheads, a coil, a metal core rod and an outer tube. The metal core rod has a screw-shaped through-flute on its surface and two holes separately on its two ends joining with the screw-shaped through-flute. The core rod is disposed within the outer tube wherein the screw-shaped through-flute provides a helical passageway. The outer tube and core rods are disposed within the coil. A bulkhead is disposed on each end of the outer tube. There is a water inlet on one end bulkhead and a water outlet on the other end bulkhead. Water enters the helical passageway through the water inlet in one end bulkhead and one hole of the metal core rod end, and flows out from the other end of the helical passageway via the other hole of the metal core rod end and the water outlet on the other end bulkhead. An alternating current flows in the coil to generate an alternating magnetic field that causes eddy currents in the metal core rod that heat the metal core rod. Water flowing in the helical passageway absorbs heat from the core rod and from the coils, via the outer tube, to become hot water. The water cuts across lines of magnetic force generated by the coils so as to become magnetized water.

The magnetized water generator may have two or more coils. Also, there may be two or more screw-shaped through-flutes giving rise to two or more helical passages.

According to a third aspect of the invention there is an electromagnetic water heater comprising a magnetized water generator, an outer covering, an insulting layer, a temperature controller to prevent heating without water, an anti-blockage safety valve, a water storage tank, a grounding device, a temperature probe, a circuit-operation board, a controlling device of water level, an overflow pipe, a water-mixing valve, a water pump, a display device of water level, a hot-water electromagnetic valve and a cold-water electromagnetic valve, wherein one end of the magnetized water generator is connected with the water storage tank and the other is connected with the cold-water electromagnetic valve, the hot-water electromagnetic valve and the water pump.

In order to raise the temperature of the water further there is a water pump and hot-water electromagnetic valve mounted on the water storage tank. The water is circulated through the magnetized water generator again and again via the water pump and hot-water electromagnetic valve. Once the temperature of the water rises to a predetermined value the hot-water electromagnetic valve will close and the water pump will stop.

Preferably the electromagnetic water heater has a temperature controller to prevent heating without water.

Preferably the electromagnetic water heater has an electrical leakage protector which is able to cut off the power supply automatically.

Preferably the electromagnetic water heater has a grounding system.

Preferably the electromagnetic water heater has a safety valve, which open automatically to reduce gas pressure or water pressure.

The magnetized water generator and electromagnetic water heater according to the invention save energy and have simple structure, convenient operation, good reliability, high heating efficiency and long service life. Because the magnetized water generator isolates the water from electricity it is intrinsically safe. The magnetized water generator produces wholesome magnetized hot water with high quality and thin water molecules without incrustation.

Further aspects and advantages of the invention will become apparent from the following description, which is given by way of example only.

BRIEF DESCRIPTION OF THE DRAWINGS

Embodiments of the invention will now be described with reference to the accompanying drawings in which.

DESCRIPTION OF THE PREFERRED EXAMPLES

Figure 1:
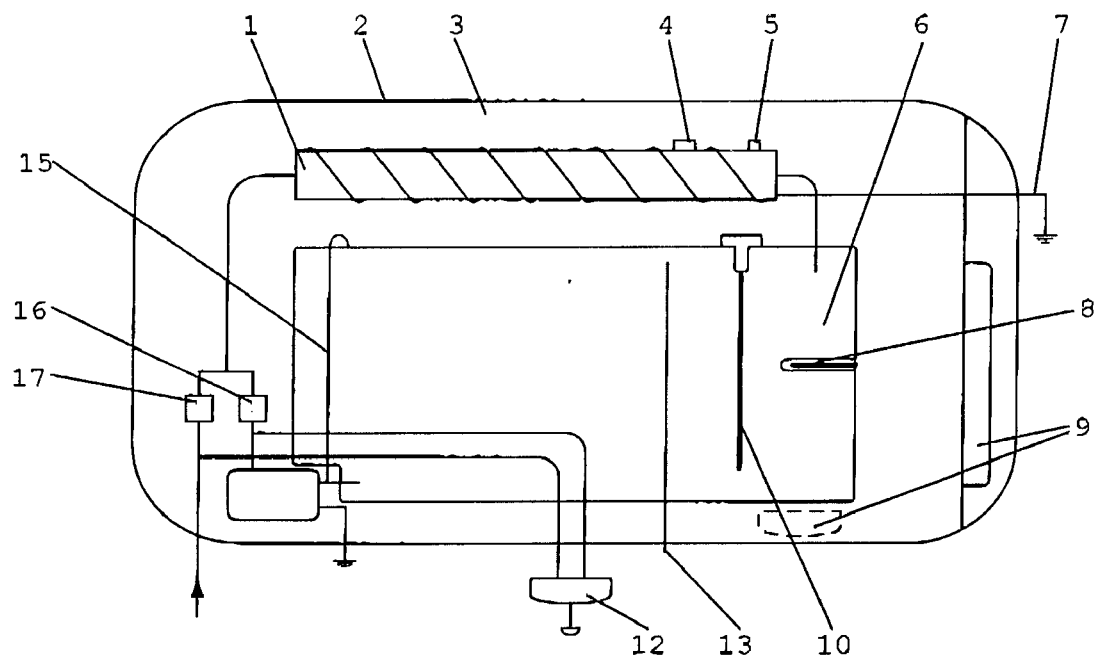
FIG. 1 illustrates a schematic of an electromagnetic water heater according to the invention.

As is shown by FIG. 1, an electromagnetic water heater comprises a magnetized water generator 1, an outer covering 2, an insulting layer 3, a temperature controller 4 to prevent heating without water, an anti-blockage safety valve 5, a water storage tank 6, a grounding device 7, a temperature probe 8, a controller circuit board 9, a controlling device of water level 10, an overflow pipe 11, a water-mixing valve 12, a water pump 14, a display device of water level 15, a hot-water electromagnetic valve 16 and a cold-water electromagnetic valve 17.

Figure 2:
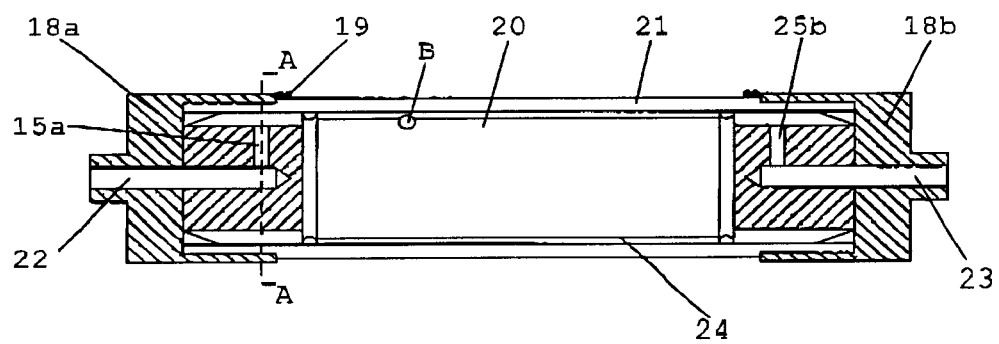
FIG. 2 illustrates the structural representation of the magnetized water generator according to the invention.
Figure 3:
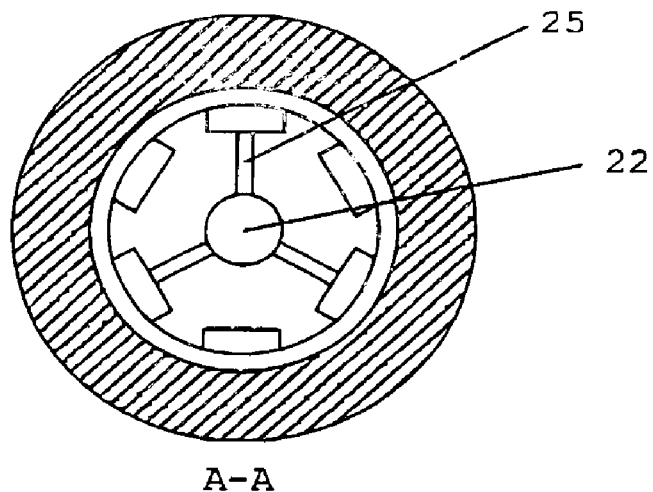
FIG. 3 illustrates the sectional drawing through A—A of FIG. 2.
Figure 4:
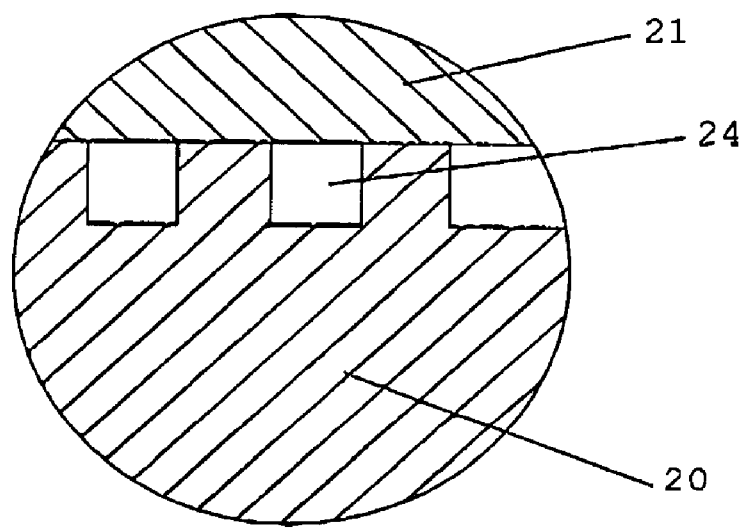
FIG. 4 illustrates an enlarged view of area B of FIG. 2.

As is shown by FIG. 2, FIG. 3 and FIG. 4, the magnetized water generator 1 is made up of two bulkheads 18a and 18b, a coil 19, a metal core rod 20 and an outer sleeve or tube 21. The core rod 20 is located within the outer tube 21 with a bulkhead 18a, 18b closing each end of the outer tube 21. The outer tube 21 and core rods 20 are located within coil 19. There is a water inlet 22 in one end bulkhead 18a and a water outlet 23 in the other end bulkhead 18b.

Referring to FIG. 4, the metal core rod 20 has a screw-shaped through-flute in its outer surface. When the core rod 20 is located within the outer tube 21 the screw-shaped through-flute creates screw-shaped or helical passage 24 between the core rod 20 and outer tube 21. Two holes 25a and 25b on each end of the core rod 20 connect the helical passage 24 with the water inlet 22 and the water outlet 23.

Water enters the helical passages 24 of the magnetized water generator through the water inlet 22 on one end bulkhead 18a and one hole 25a on one end of the metal core rod 20 in turn. The water flows out from the water outlet 23 on the other end bulkhead 18b via the other hole 25b in the other end of the metal core rod 20. An alternating current is passed through coil 19 generating an alternating magnetic field that causes eddy currents in the metal core rod 20 to produce heating (eddy current heating). In addition to heating of the metal core rod 20, heat will also be generated within coil 19 and transferred to outer tube 21 by convection. Water flowing in the helical passage 24 absorbs heat from core rod 20 and from outer tube 21. At the same time, because the helical passage 24 extend the water path through the magnetized water generator the water will stay in the magnetized water generator for a longer period of time and cut across lines of magnetic force generated by the coils. This causes it to become magnetized water.

Referring to FIG. 3, in the preferred embodiment of the invention there are three screw-shaped through-flutes in the surface of the metal core rod 20, creating three helical passages 24. There are three corresponding holes on each end of the metal core rod 20 to join the passages 24 with the inlet 22 and outlet 23. The section of screw-shaped through-flute is quadrate, circular or polygonal.

Preferably the outer tube is made of material with good thermal properties so as to make sure that the heating generated by the coils is well absorbed by the water flowing in the helical passage 24.

Operation of the electromagnetic water heater will now be described. After the power source is switched on, the cold-water electromagnetic valve 17 opens so that water flows into the water storage tank 6 via the magnetized water generator 1. One end of the magnetized water generator is connected with the water storage tank 6, while the other is connected with the water pump 14 via the hot-water electromagnetic valve 16 and the cold-water electromagnetic valve 17. An alternating electric current flows through the coil of the magnetized water generator. The alternating current creates an alternating magnetic field, which in turn causes eddy current heating of the core rod. The flowing water absorbs the heat and cuts across lines of magnetic force in the magnetic field so as to become magnetized hot water at the same moment.

When the water level reaches its maximum the cold-water electromagnetic valve 17 closes, the hot-water electromagnetic valve 16 opens and water pump 14 starts. The water pump 14 circulates water from storage tank 6 through the magnetized water generator 1 until the temperature of the water reaches the desired level. When the desired level is reached the water pump 14 stops and valve 16 closes. The water to be used stays in the water storage tank 6. If the temperature of the water drops below the desired level the water pump 6 and the hot-water electromagnetic valve 16 will open automatically so that the water pump 16 circulates water from the storage tank 6 through the magnetized water generator 1.

Figure 5:
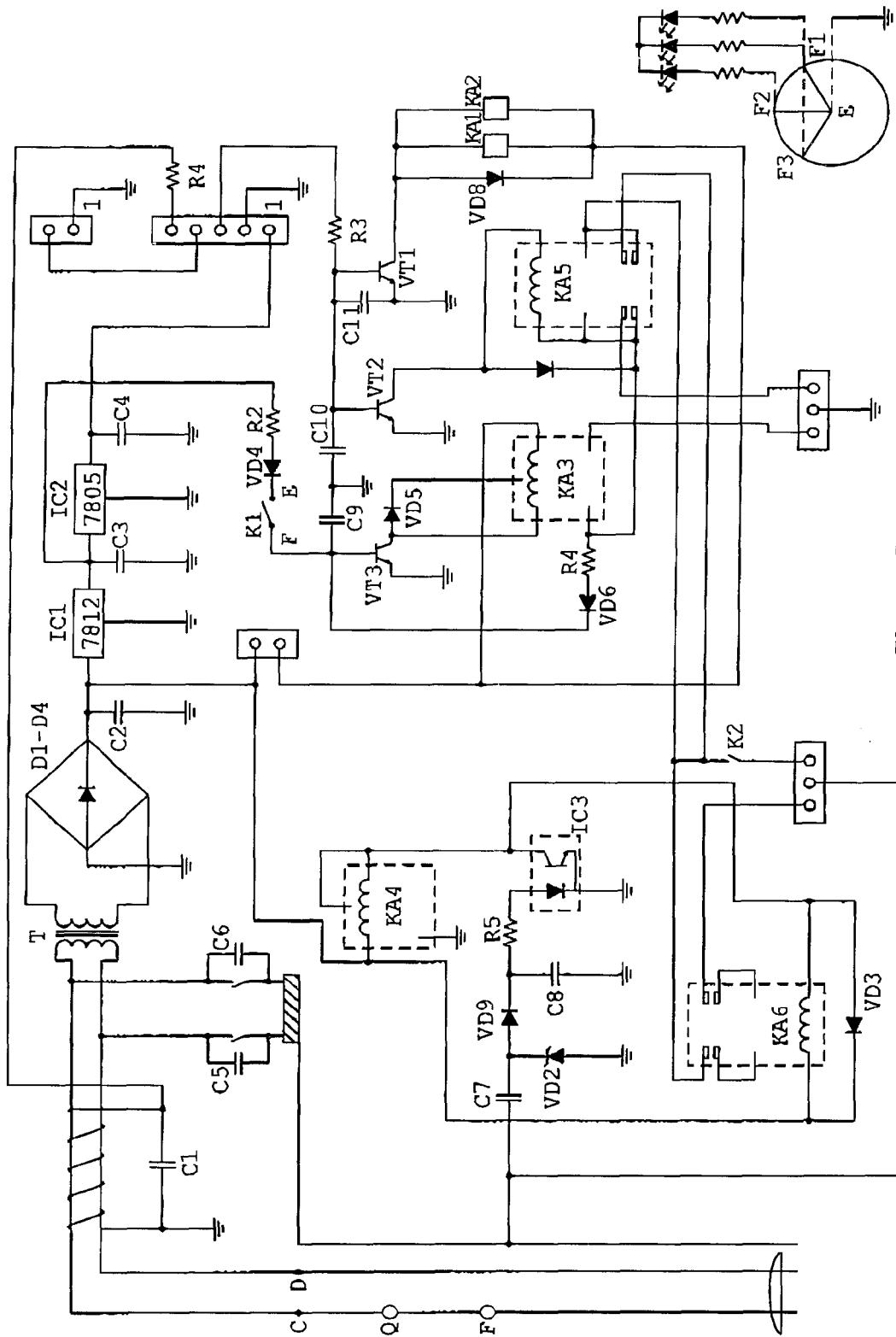
FIG. 5 illustrates a circuit diagram for an electromagnetic water heater controller.

As is shown by FIG. 5, the invention has a water pump 14 controller to prevent heating without water, an electrical leakage protector which is able to cut off the power supply automatically, a grounding system and a safety valve which automatically opens to reduce gas pressure or water pressure. The circuit of the invention adopts available techniques to control the water heater.

What I claim is:

1. An electromagnetic water heater comprising:

an outer cover, a water tank within the cover for receiving and storing a quantity of heated water, a heating element having an inlet and an outlet connected with the water tank, a first valve for allowing a flow of cold water to the inlet of the heating element, a water pump having an inlet connected with the water tank and an outlet, a second valve connected to the water pump outlet for allowing a flow of water from the water tank to the heating element inlet, and a controller for selectively opening the first or second valves to provide and maintain a quantity of heated water in the water tank, wherein the heating element further comprises:

an electric coil, an outer tube disposed within the coil, a metal core rod disposed within the outer tube, two end bulkheads, one at each end of the outer tube, and a water inlet in one end bulkhead and a water outlet on the other end bulkhead, wherein the metal core rod has a screw-shaped through-flute in its surface and two holes separately on its two ends to connect the screw-shaped through-flute with the water inlet and the water outlet, the screw-shaped through-flute creating a helical passage between the metal core rod and the outer tube between the water inlet and water outlet.

2. An electromagnetic water heater as claimed in claim 1 wherein an alternating current flows in the coil, the alternating current generating an alternating longitudinal magnetic field which passes through the metal core rod and gives rise to eddy currents that generate heat which is absorbed by water flowing along the helical passageway, and wherein at the same time the water is magnetized as it cuts across lines of magnetic force of the alternating longitudinal magnetic field.

3. An electromagnetic water heater as claimed in claim 1 further including a temperature controller for preventing operation of the electromagnetic water heater without water.

4. An electromagnetic water heater as claimed in claim 1 further including an electrical leakage protector for cutting of the power when there is an electrical leakage.

5. An electromagnetic water heater as claimed in claim 1 further including a grounding safety system.

6. An electromagnetic water heater as claimed in claim 1 further including a safety valve mounted on the magnetized water generator.

* * * * *